(12) United States Patent
Park et al.

(10) Patent No.: US 11,799,113 B2
(45) Date of Patent: Oct. 24, 2023

(54) ELECTROLYTE MEMBRANE WITH IMPROVED CHEMICAL DURABILITY AND MEMBRANE-ELECTRODE ASSEMBLY INCLUDING SAME

(71) Applicants: Hyundai Motor Company, Seoul (KR); Kia Corporation, Seoul (KR); Industry Foundation of Chonnam National University, Gwangju (KR)

(72) Inventors: In Yu Park, Seoul (KR); Jong Kil Oh, Gyeonggi-do (KR); Sun Ju Song, Seoul (KR); Jae Woon Hong, Jeollanam-do (KR); Aniket Kumar, Gwangju (KR); Ye Jin Yun, Jeollanam-do (KR)

(73) Assignees: Hyundai Motor Company, Seoul (KR); Kia Corporation, Seoul (KR); Industry Foundation of Chonnam National University, Gwangju (KR)

( * ) Notice: Subject to any disclaimer, the term of this patent is extended or adjusted under 35 U.S.C. 154(b) by 107 days.

(21) Appl. No.: 17/544,713

(22) Filed: Dec. 7, 2021

(65) Prior Publication Data
US 2022/0393213 A1    Dec. 8, 2022

(30) Foreign Application Priority Data
Jun. 3, 2021 (KR) .......................... 10-2021-0072264

(51) Int. Cl.
*H01M 8/1051* (2016.01)
*H01M 8/1004* (2016.01)
*C25B 11/04* (2021.01)
*C25B 1/04* (2021.01)
*H01M 8/10* (2016.01)

(52) U.S. Cl.
CPC ........... *H01M 8/1051* (2013.01); *C25B 11/04* (2013.01); *H01M 8/1004* (2013.01); *C25B 1/04* (2013.01); *H01M 2008/1095* (2013.01)

(58) Field of Classification Search
CPC ............. H01M 8/1051; H01M 8/1004; H01M 2008/1095; C25B 1/04; C25B 11/04
USPC ........................................................ 429/483
See application file for complete search history.

(56) References Cited

U.S. PATENT DOCUMENTS

| | | | | |
|---|---|---|---|---|
| 2006/0257706 A1* | 11/2006 | Hidaka | ............... | H01M 8/0289 |
| | | | | 429/492 |
| 2012/0107721 A1* | 5/2012 | Onuma | ............... | H01M 8/1067 |
| | | | | 429/492 |
| 2013/0196055 A1* | 8/2013 | Berta | .................. | H01M 4/8807 |
| | | | | 427/115 |
| 2020/0099061 A1* | 3/2020 | Price | .......................... | C25B 9/23 |
| 2020/0212469 A1* | 7/2020 | Ko | ....................... | H01M 8/1004 |

FOREIGN PATENT DOCUMENTS

| | | |
|---|---|---|
| KR | 100766977 B1 | 10/2007 |
| KR | 100923899 B1 | 10/2009 |
| KR | 101100581 B1 | 12/2011 |
| KR | 2013-0110569 A | 10/2013 |

(Continued)

*Primary Examiner* — James M Erwin
(74) *Attorney, Agent, or Firm* — Fox Rothschild LLP

(57) ABSTRACT

Disclosed is an electrolyte membrane including an antioxidant containing elemental sulfur or a sulfur compound to improve antioxidant activity and resistance to acids. In addition, a membrane-electrode assembly including the electrolyte membrane is disclosed.

15 Claims, 3 Drawing Sheets

(56) References Cited

FOREIGN PATENT DOCUMENTS

| KR | 101391707 B1 | 5/2014 |
| KR | 101640671 B1 | 7/2016 |
| KR | 101669217 B1 | 10/2016 |
| KR | 2020-0114511 A | 10/2020 |
| KR | 2020-0117114 A | 10/2020 |

* cited by examiner

ELECTROLYTE MEMBRANE WITH IMPROVED CHEMICAL DURABILITY AND MEMBRANE-ELECTRODE ASSEMBLY INCLUDING SAME

CROSS REFERENCE TO RELATED APPLICATION

The present application claims priority to Korean Patent Application No. 10-2021-0072264, filed Jun. 3, 2021, the entire contents of which is incorporated herein for all purposes by this reference.

TECHNICAL FIELD

The invention relates to an electrolyte membrane including an antioxidant containing elemental sulfur or a sulfur compound to improve antioxidant activity and resistance to acids and a membrane-electrode assembly including the same.

BACKGROUND

Hydrogen and oxygen that are reaction gases for a fuel cell cross over through an electrolyte membrane to facilitate generation of hydrogen peroxide (HOOH). The hydrogen peroxide generates oxygen-containing radicals such as hydroxyl radicals (·OH) and hydroperoxyl radicals (·OOH). These radicals attack a perfluorinated sulfonic electrolyte membrane, causing the chemical degradation of the membrane, which in turn reduces the durability of a fuel cell.

Cerium oxide ($CeO_2$), a primary antioxidant that can remove hydroxyl radicals and hydroperoxyl radicals is often used to prevent chemical deterioration of the electrolyte membrane and increase long-term chemical durability of the electrolyte membrane.

In the process of manufacturing an electrolyte membrane, an antioxidant such as cerium oxide is added and dispersed in an ionomer dispersion composed of solid-phase ionomers and solvents. In the process, the antioxidant may be dissolved due to the high acidity of the ionomer dispersion. The metal element of the ionized antioxidant leaves the initial site in the electrolyte membrane during operation of the fuel cell, and the metal-free site becomes vulnerable to attack by radicals. Therefore, antioxidants are required to exhibit high antioxidant activity and resistance to acids.

SUMMARY OF THE INVENTION

In one preferred aspect, provided is a novel antioxidant that is improved in antioxidant activity and resistance to acids.

In one preferred aspect, provided is a long-term, durable electrolyte film including the antioxidant having improved antioxidant activity and acid resistance.

However, the objectives of the present invention are not limited the one described above. The objectives of the present invention will become more apparent from the following description and will be realized with components recited in the claims and combinations of the components.

In an aspect, provided is an electrolyte membrane including an ionomer and an antioxidant dispersed in the ionomer. In particular, the antioxidant may include elemental sulfur, sulfur compounds, and combinations thereof.

The term "ionomer" as used herein refers to a polymeric material or resin that includes ionized groups attached (e.g. covalently bonded) to the backbone of the polymer as pendant groups. Preferably, such ionized groups may be functionalized to have ionic characteristics, e.g., cationic or anionic.

The ionomer may suitably include one or more polymers selected from the group consisting of a fluoro-based polymer, a perfluorosulfone-based polymer, a benzimidazole-based polymer, a polyimide-based polymer, a polyetherimide-based polymer, a polyphenylene sulfide-based polymer, a polysulfone-based polymer, a polyethersulfone-based polymer, a polyetherketone-based polymer, a polyetheretherketone-based polymer, a polyphenylquinoxaline-based polymer and a polystyrene-based polymer.

The ionomer may include a perfluorinated sulfonic acid ionomer.

The above antioxidants may not contain oxidative cargo compounds.

Particularly, the sulfur compounds may include a compound represented by Formula 1.

$$MS_x \qquad \text{[Formula 1]}$$

Here, M includes one or more selected from the group consisting of Se, Pb, Mo, and Bi, and x is an integer in a range of 1 to 3.

The sulfur compounds may include $SeS_2$.
The sulfur compounds may include PbS.
The sulfur compounds may include $MoS_2$.
The sulfur compounds may include $Bi_2S_3$.

The electrolyte membrane may contain the antioxidant in an amount of about 0.05% to 20% by weight based on the total weight of the electrolyte membrane.

The crystallite size of the antioxidant ranges from about 3 to about 100 nm.

The electrolyte membrane may include a reinforcing layer impregnated with the ionomer.

The reinforcing layer 11 may include one or more selected from the group consisting of polytetrafluoroethylene (PTFE), extended polytetrafluoroethylene (e-PTFE), polyethylene (PE), polypropylene (PP), polyphenylene oxide (PPO), polybenzimidazole (PBI), polyimide (PI), polyvinylidene fluoride (PVdF), and polyvinyl chloride (PVC).

In an aspect, provided is a membrane-electrode assembly including the electrolyte membrane described herein and two electrodes provided on respective sides of the electrolyte membrane.

The electrodes may contain the antioxidant.

The membrane-electrode assembly may be used for a fuel cell or a water electrolysis apparatus.

Since the antioxidant according to various exemplary embodiments of the present invention has the antioxidant activity and the acid resistance that are both improved compared to conventional counterparts, the electrolyte membrane is significantly improved in long-term durability.

However, the advantages of the present invention are not limited thereto. It is noted that the advantages of the present invention include all effects that can be inferred from the description given below.

BRIEF DESCRIPTION OF THE DRAWINGS

The above and other objectives, features, and other advantages of the present invention will be more clearly understood from the following detailed description taken in conjunction with the accompanying drawings, in which.

DETAILED DESCRIPTION

Figure 1:
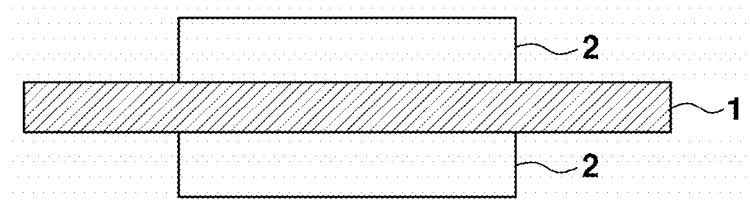
FIG. 1 shows an exemplary membrane-electrode assembly according to an exemplary embodiment of the present invention.

Above objectives, other objectives, features, and advantages of the present invention will be readily understood from the following preferred embodiments associated with the accompanying drawings. However, the present invention is not limited to the embodiments described herein and may be embodied in other forms. The embodiments described herein are provided so that the disclosure can be made thorough and complete and that the spirit of the present invention can be fully conveyed to those skilled in the art.

Throughout the drawings, like elements are denoted by like reference numerals. In the accompanying drawings, the dimensions of the structures are larger than actual sizes for clarity of the present invention. Terms used in the specification, "first", "second", etc., may be used to describe various components, but the components are not to be construed as being limited to the terms. These terms are used only for the purpose of distinguishing a component from another component. For example, a first constitutive element may be referred as a second constitutive element, and the second constitutive element may be also referred to as the first constitutive element. As used herein, the singular forms "a", "an", and "the" are intended to include the plural forms as well unless the context clearly indicates otherwise.

It will be further understood that the terms "comprise", "include", or "have" when used in this specification specify the presence of stated features, regions, integers, steps, operations, elements and/or components, but do not preclude the presence or addition of one or more other features, regions, integers, steps, operations, elements, components and/or combinations thereof. It will also be understood that when an element such as a layer, film, area, or sheet is referred to as being "on" another element, it can be directly on the other element, or intervening elements may be present therebetween. Similarly, when an element such as a layer, film, area, or sheet is referred to as being "under" another element, it can be directly under the other element, or intervening elements may be present therebetween.

Unless otherwise specified, all numbers, values, and/or representations that express the amounts of components, reaction conditions, polymer compositions, and mixtures used herein are to be taken as approximations including various uncertainties affecting measurement that inherently occur in obtaining these values, among others, and thus should be understood to be modified by the term "about" in all cases.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated.

In the present specification, when a range is described for a variable, it will be understood that the variable includes all values including the end points described within the stated range. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

FIG. 1 is a cross-sectional view schematically illustrating a membrane-electrode assembly according to an exemplary embodiment of the present invention. As shown in FIG. 1, the membrane-electrode assembly includes an electrolyte membrane 1 and a pair of electrodes 2 provided on the respective surfaces of the electrolyte membrane 1. The pair of electrodes refers to an anode and a cathode. The anode and cathode are positioned to face the respective surfaces of the electrolyte membrane interposed therebetween.

Figure 2:
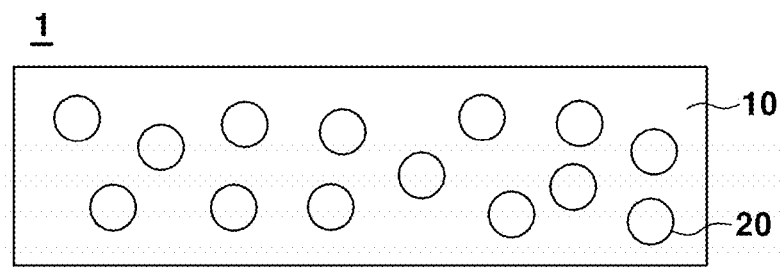
FIG. 2 shows an exemplary electrolyte membrane according to an exemplary embodiment of the present invention.

FIG. 2 is a cross-sectional view of an electrolyte membrane 1 according to an exemplary embodiment of the present invention. The electrolyte membrane 1 includes an ionomer 10 and an antioxidant 20 dispersed in the ionomer 10.

The ionomer 10 may be provided in the form of a film having a predetermined area and a predetermined thickness and may have hydrogen ion conductivity to control the movement of hydrogen ions between electrodes 2.

Any material can be used for the ionomer 10 if the material has hydrogen ion conductivity. For example, there is a perfluorinated sulfonic acid ionomer.

The antioxidant 20 may include elemental sulfur, sulfur compounds, and combinations thereof.

Since conventional oxide-based antioxidants, such as cerium oxide, have weak resistance to acids, they are easily dissolved in an ionomer dispersion, thereby deteriorating the durability of the electrolyte membrane in which the antioxidant is included. Accordingly, the present invention is characterized in that an antioxidant containing sulfur that is excellent in both antioxidant activity and resistance to acids is used instead of an oxide-based antioxidant having weak resistance to acids.

As used herein, the term "elemental" refers to a simple substance that consists of the atoms of a chemical element and exhibits unique chemical properties. Therefore, the elemental sulfur is a substance consisting of sulfur atoms and having unique chemical properties.

Specifically, the sulfur compound refers to a compound represented by Formula 1 shown below.

MS$_x$ [Formula 1]

Here, M includes one or more selected from the group consisting of Se, Pb, Mo, and Bi, and x is an integer in a range of 1 to 3.

Particularly, these sulfur compound may include at least one selected from the group consisting of SeS$_2$, PbS, MoS$_2$, and Bi$_2$S$_3$.

In the electrolyte membrane 1, the content of the antioxidant 20 is in a range of about 0.05% to 20% by weight or in a range of about 0.1% to 5% by weight, based on the total weight of the electrolyte membrane. When the content of the antioxidant 20 in the electrolyte membrane is less than about 0.05% by weight, it is difficult to improve the antioxidant activity to an ideal level due to the insufficiency of the antioxidant. On the other hand, when the content of the antioxidant is greater than about 20% by weight, the hydrogen ion conductivity of the electrolyte membrane 1 may be reduced and the brittleness of the electrolyte membrane 1 may be increased due to the insufficiency of the ionomer.

The crystallite size of the antioxidant 20 is in a range of about 3 to 100 nm. When the crystallite size of the antioxidant 20 is less than about 3 nm, it is difficult for the antioxidant 20 to be prepared in a powder form or to be added to the ionomer as a powder. On the other hand, when the crystallite size is greater than about 100 nm, the effect of increasing the chemical durability of the electrolyte membrane is not significantly improved.

The antioxidant 20 may also be included in the electrodes 2. The content of the antioxidant 20 included in the electrodes 2 will be suitably adjusted depending on the contents of a catalyst, a binder, and the like.

Figure 3:
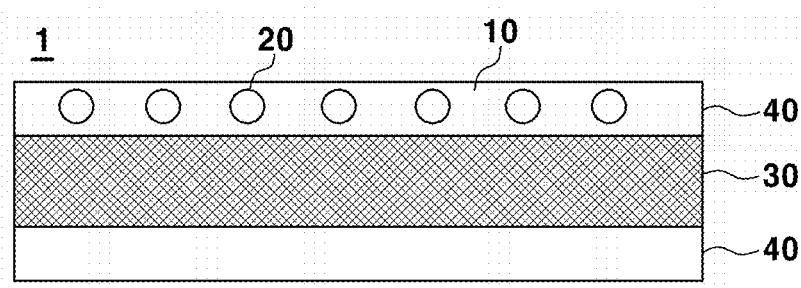
FIG. 3 shows an exemplary electrolyte membrane according to an exemplary embodiment of the present invention.

FIG. 3 is a cross-sectional view of an electrolyte membrane 1 according to an exemplary embodiment of the present invention. The electrolyte membrane 1 includes a porous reinforcing layer 30 and an ion transport layer 40 disposed on at least one surface of the reinforcing layer 30.

The reinforcing layer 30 may be provided to increase the mechanical strength of the electrolyte membrane. The reinforcing layer 30 may include one or more selected from the group consisting of polytetrafluoroethylene (PTFE), extended polytetrafluoroethylene (e-PTFE), polyethylene (PE), polypropylene (PP), and polyphenylene oxide (PPO), polybenzimidazole (PBI), polyimide (PI), polyvinylidene fluoride (PVdF), and polyvinyl chloride (PVC). The reinforcing layer 11 may be a porous film having numerous pores.

The reinforcing layer 30 may be a layer impregnated with the ionomer 10. The reinforcing layer 30 may further include an antioxidant 20 dispersed in an ionomer 10.

The ion transport layer 40 may include the ionomer 10 and the antioxidant 20 dispersed in the ionomer 10.

Figure 4:
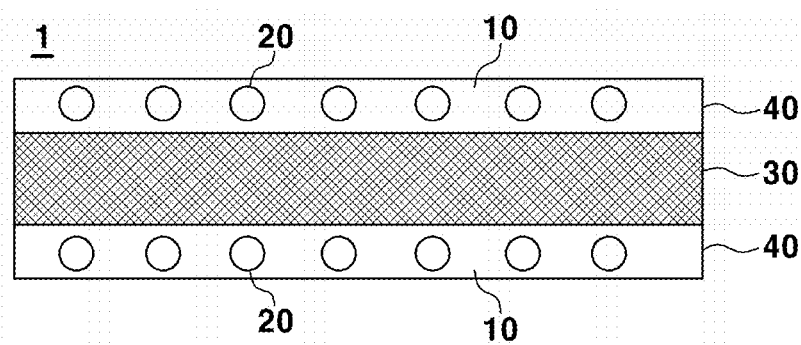
FIG. 4 shows an exemplary electrolyte membrane according to an exemplary embodiment of the present invention.

FIG. 4 is a cross-sectional view of an electrolyte membrane 1 according to a third embodiment of the present invention. As shown in FIG. 4, both surfaces of a reinforcing layer 30 are provided with respective ion transport layers 40, and each of the ion transport layers 40 includes an ionomer 10 and an antioxidant 20 dispersed in the ionomer 10.

EXAMPLE

Hereinbelow, the present invention will be described in more detail with reference to examples. However, the examples are presented only for illustrative purposes, and should not be interpreted to limit the scope of the present invention.

Experimental Example 1

The antioxidant activity of each of the samples listed in Table 1 was evaluated using a metal violet test. The metal violet test was reported by Y. Xue et al. in J. Phys. Chem. C, 115, 4433-4438 (2011).

TABLE 1

| Classification | Type of antioxidant | Content of antioxidant |
|---|---|---|
| Comparative Example 1 | No | — |
| Comparative Example 2 | CeO$_2$ | 1% by weight |
| Example 1 | S | 1% by weight |
| Example 2 | SeS$_2$ | 1% by weight |
| Example 3 | PbS | 1% by weight |
| Example 4 | Bi$_2$S$_3$ | 1% by weight |
| Example 5 | MoS$_2$ | about 0.2% by weight |

Figure 5:
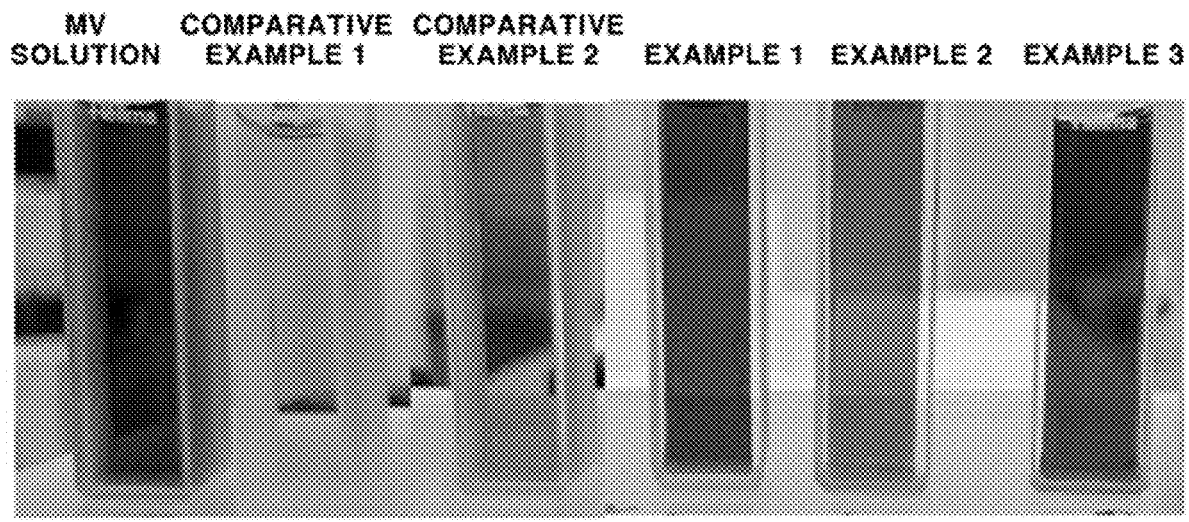
FIG. 5 shows a result of measuring the antioxidant properties of each sample using a methyl violet test in Experimental Example 1.

Methyl violet, iron (II) sulfate heptahydrate (FeSO$_4$·7H$_2$O), and hydrogen peroxide were mixed in a mass ratio of 30:1:1 to prepare a methyl violet test solution. Each of the antioxidants listed in Table 1 was added to the prepared test solution to be a predetermined content shown in Table 1, and the change of color of the methyl violet test solution was observed. When the added antioxidant does not exhibit an antioxidant activity, radicals originating in the hydrogen peroxide react with the methyl violet, so that the methyl violet test solution becomes colorless. On the other hand, when the antioxidant exhibits a sufficient antioxidant activity, the decomposition of the hydrogen peroxide is inhibited. In this case, there was no change in the color of the methyl violet test solution. The results are shown in FIG. 5.

Comparison Example 1 is a case where no antioxidant was used. In this case, the methyl violet test solution became colorless. Comparison Example 2 is a case where CeO$_2$ was used as the antioxidant. In Comparison Example 2, the violet color of the solution became lighter.

Examples 1 to 5 in which the antioxidant according to the present invention was used show that the violet color of the solution is maintained.

Experimental Example 2

To compare the antioxidant activities of the respective antioxidants more precisely, the absorbance intensity of each sample was measured by UV-visible spectroscopy using a UV-Vis spectrometer, UV-3600 manufactured by Shimadzu Corporation in Japan. When the antioxidant activity of an antioxidant is exhibited, the absorption peak appears at a wavelength of 582 nm which is the unique absorption wavelength of the methyl violet. However, when there is no antioxidant activity, the absorption peak does not appear at the same wavelength.

Figure 6:
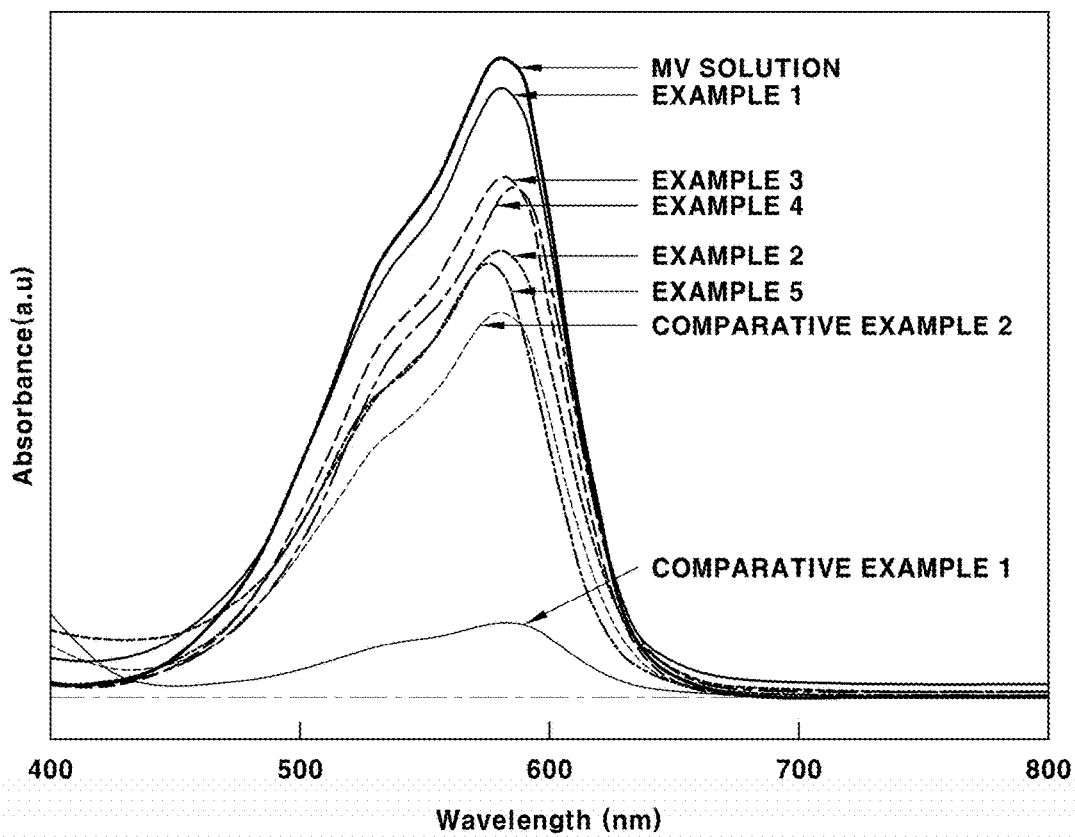
FIG. 6 shows a result of measuring the antioxidant properties of each sample using a UV-visible spectrometer in Experimental Example 2.

Each of the solutions as prepared in Example 1 was stirred for 24 hours, followed by centrifugation, to remove the antioxidant from each solution. The supernatant of each solution was collected, and the absorption intensity was measured. The results are shown in FIG. 6.

As in Example 1, since the solutions of Comparison Example 1 contained no antioxidant, an absorption peak was not observed from each of the solutions.

On the other hand, in the case of the solutions prepared as in Examples 1 to 5, since each of the solutions contained a predetermined antioxidant, a relatively high absorbance intensity was observed in comparison with the solutions of Comparative Examples 1 and 2. These test results show that the solutions of Examples 1 to 5 have a good antioxidant activity.

Experimental Example 3

To evaluate the chemical durability of each the electrolyte membranes containing the respective antioxidants shown in Table 1, the electrolyte membranes containing respectively different antioxidants shown in Table 1 were dipped in a Fenton solution for 24 hours, and then the fluoride ion release rate was measured for each electrolyte membrane. When one antioxidant does not exhibit a sufficient antioxidant activity, the electrolyte membrane containing the antioxidant is degraded by the attack of radicals generated through the reaction between the Fenton solution and the electrolyte membrane. As a result, fluoride ions were released. Therefore, by measuring the concentration of fluoride ions in the Fenton solution after a certain period, the antioxidant activity of the electrolyte membrane was compared and evaluated.

Figure 7:
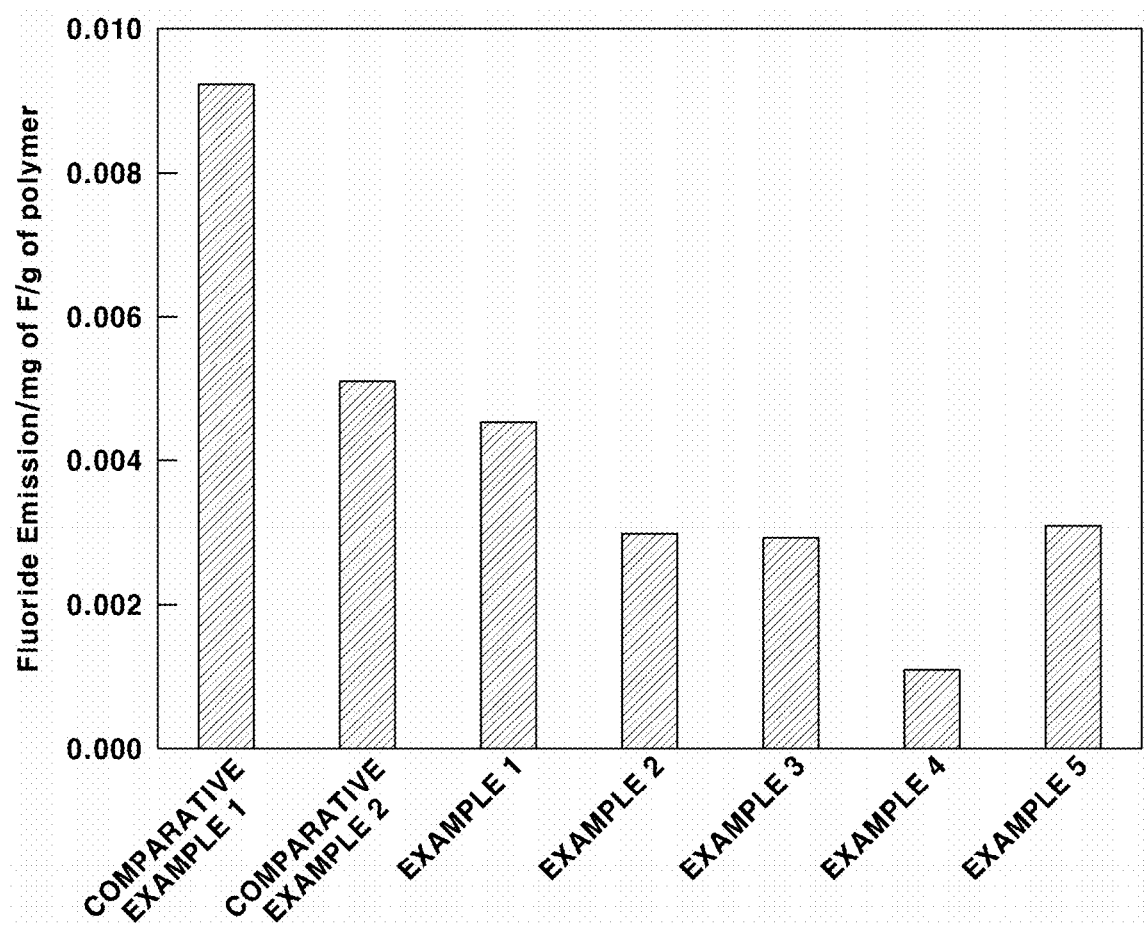
FIG. 7 shows a result of evaluating the chemical durability of electrolyte membranes including the respective samples, on the basis of the fluoride ion release rate using a Fenton solution.

Comparison Example 1 used an electrolyte membrane that was prepared by casting and drying a perfluorinated sulfonic acid ionomer dispersion with no antioxidant. Comparison Example 2 and Examples 1 to 4 used electrolyte membranes manufactured by casting and drying after addition of the respective antioxidants shown in Table 1 to be about 1% by weight with respect to the weight of each of the dried electrolyte membranes. Examples 5 used electrolyte membranes manufactured by casting and drying after addition of the respective antioxidants shown in Table 1 to be about 0.2% by weight with respect to the weight of the dried electrolyte membrane. Each electrolyte membrane was cut into pieces a size of 5 cm×5 cm. A Fenton solution for testing was prepared by adding iron (II) sulfate heptahydrate to a 10% hydrogen peroxide solution to have a concentration of 10 ppm, and the pieces of the electrolyte membrane were dipped in the Fenton solution. The results are shown in FIG. 7.

Examples 1 to 5 exhibited a relatively low fluoride ion release rate compared to Comparative Example 1 in which no antioxidant was used and Comparative Example 2 in which $CeO_2$ was used as an antioxidant. The result of this test also showed that the antioxidant activity was highly exhibited.

Although examples and experimental examples according to various exemplary embodiments of the present invention have been described for illustrative purposes, those skilled in the art will appreciate that various modifications, additions, and substitutions are possible, without departing from the scope and spirit of the invention as defined by the appended claims,

What is claimed is:
1. An electrolyte membrane comprising:
an ionomer; and
an antioxidant dispersed in the ionomer,
wherein the antioxidant comprises elemental sulfur, sulfur compounds, and combinations thereof,
wherein the sulfur compound comprises a compound represented by Formula 1,

$$MS_x,$$ [Formula 1]

wherein M comprises one or more selected from the group consisting of Se, Pb, Mo, and Bi, and x is an integer in a range of 1 to 3.

2. The electrolyte membrane according to claim 1, wherein the ionomer comprises a perfluorinated sulfonic acid ionomer.

3. The electrolyte membrane according to claim 1, wherein the antioxidant does not comprise an oxide-based compound.

4. The electrolyte membrane according to claim 1, wherein the sulfur compound comprises $SeS_2$.

5. The electrolyte membrane according to claim 1, wherein the sulfur compound comprises PbS.

6. The electrolyte membrane according to claim 1, wherein the sulfur compound comprises $MoS_2$.

7. The electrolyte membrane according to claim 1, wherein the sulfur compound comprises $Bi_2S_3$.

8. The electrolyte membrane according to claim 1, wherein the electrolyte membrane comprises the antioxidant in an amount of about 0.05% to 20% by weight based on the total weight of the electrolyte membrane.

9. The electrolyte membrane according to claim 1, wherein the crystallite size of the antioxidant ranges from about 3 nm to about 100 nm.

10. The electrolyte membrane according to claim 1, further comprising a reinforcing layer impregnated with the ionomer.

11. The electrolyte membrane according to claim 10, wherein the reinforcing layer comprises one or more selected from the group consisting of polytetrafluoroethylene (PTFE), extended polytetrafluoroethylene (e-PTFE), polyethylene (PE), polypropylene (PP), polyphenylene oxide (PPO), polybenzimidazole (PBI), polyimide (PI), polyvinylidene fluoride (PVdF), and polyvinyl chloride (PVC).

12. A membrane-electrode assembly (MEA) comprising:
an electrolyte membrane of claim 1; and
a pair of electrodes, the electrodes being disposed on both surfaces of the electrolyte membrane, respectively.

13. The membrane-electrode assembly according to claim 12, wherein each of the electrodes comprises an antioxidant.

14. A fuel cell comprising the membrane-electrode assembly of claim 12.

15. A water electrolysis apparatus including the membrane-electrode assembly of claim 12.

* * * * *